(12) United States Patent
Ikriannikov

(10) Patent No.: US 8,547,076 B1
(45) Date of Patent: Oct. 1, 2013

(54) MULTIPHASE CONTROL SYSTEMS AND ASSOCIATED METHODS

(75) Inventor: Alexandr Ikriannikov, Castro Valley, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 386 days.

(21) Appl. No.: 13/045,434

(22) Filed: Mar. 10, 2011

(51) Int. Cl.
*G05F 1/59* (2006.01)
*G05F 1/575* (2006.01)

(52) U.S. Cl.
USPC ................. 323/272; 323/283; 323/285

(58) Field of Classification Search
USPC ............... 323/225, 268, 271, 272, 282, 283, 323/284, 285
See application file for complete search history.

(56) References Cited

U.S. PATENT DOCUMENTS

| | | | |
|---|---|---|---|
| 4,348,640 A | 9/1982 | Clendening | |
| 4,456,872 A | 6/1984 | Froeschle | |
| 5,570,276 A | 10/1996 | Cuk et al. | |
| 5,808,455 A | 9/1998 | Schwartz et al. | |
| 5,912,552 A | 6/1999 | Tateishi | |
| 5,955,872 A | 9/1999 | Grimm | |
| 5,959,443 A | 9/1999 | Littlefield | |
| 5,999,433 A | 12/1999 | Hua et al. | |
| 6,144,194 A * | 11/2000 | Varga | 323/285 |
| 6,307,356 B1 | 10/2001 | Dwelley | |
| 6,362,986 B1 | 3/2002 | Schultz et al. | |
| 6,366,066 B1 | 4/2002 | Wilcox | |
| 6,445,244 B1 | 9/2002 | Stratakos et al. | |
| 6,600,298 B2 | 7/2003 | McDonald et al. | |
| 6,628,106 B1 * | 9/2003 | Batarseh et al. | 323/222 |
| 6,707,281 B2 | 3/2004 | Solivan | |
| 6,815,939 B2 | 11/2004 | Umemoto et al. | |
| 6,836,100 B2 | 12/2004 | Egan et al. | |
| 6,853,562 B2 | 2/2005 | Zhang | |
| 7,002,325 B2 * | 2/2006 | Harris et al. | 323/272 |
| 7,030,512 B2 | 4/2006 | Krein | |
| 7,170,267 B1 | 1/2007 | McJimsey | |
| 7,239,530 B1 | 7/2007 | Djekic et al. | |
| 7,317,305 B1 | 1/2008 | Stratakos et al. | |
| 7,463,498 B1 | 12/2008 | Djekic et al. | |
| 7,548,046 B1 | 6/2009 | Stratakos et al. | |

(Continued)

OTHER PUBLICATIONS

Arbetter et al., "Control method for low-voltage DC power supply in battery-powered systems with power management," IEEE Power Electronics Specialists Conference, St. Louis, Missouri, Jun. 22-27, 1997, 7 pages.
Levin, G., et al."Designing with hysteretic current-mode control," EDN Access, Apr. 28, 1994, http://www.reed-electronics.com/ednmag/archives/1994/04294/09df3.htm, 10 pages.

(Continued)

*Primary Examiner* — Gary L Laxton
(74) *Attorney, Agent, or Firm* — Lathrop & Gage LLP

(57) ABSTRACT

A control system for regulating an output voltage of a DC-DC converter having N phases, where N is an integer greater than one, includes a pulse generator and a frequency divider. The pulse generator generates a stream of fixed on-time pulses, each pulse triggered in response to current through an alternating one of the N phases falling to a threshold value. The frequency divider divides the stream of fixed on-time pulses into N phase signals for controlling the N phases. A method for regulating an output voltage of a DC-DC converter having N phases, includes the following steps: (1) generating a stream of fixed on-time pulses, each pulse triggered in response to current through an alternating one of the N phases falling to a threshold value, and (2) dividing the stream of fixed on-time pulses into N phase signals for controlling the N phases.

20 Claims, 15 Drawing Sheets

(56) References Cited

U.S. PATENT DOCUMENTS

| | | |
|---|---|---|
| 7,859,238 B1 | 12/2010 | Stratakos et al. |
| 8,068,355 B1 | 11/2011 | Ikriannikov et al. |
| 2012/0043818 A1 | 2/2012 | Stratakos et al. |
| 2012/0043823 A1 | 2/2012 | Stratakos et al. |
| 2012/0043923 A1 | 2/2012 | Ikriannikov et al. |
| 2012/0044014 A1 | 2/2012 | Stratakos et al. |

OTHER PUBLICATIONS

Levin, G., et al. "Designing with hysteretic current-mode control," EDN Access, Apr. 11, 1996 http://www.reed-electronics.com/ednmag/archives/1996/041196/08df5.htm, 11 pages.

Analog Devices ADP3205 datasheet, "Multiphase IMVP-IV Core Controller for Mobile CPUs," copyright 2003. pp. 1-22.

\* cited by examiner

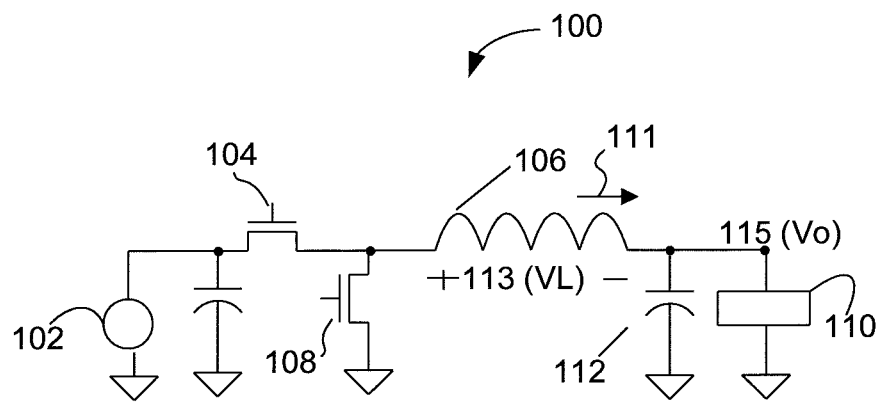
PRIOR ART FIG. 1
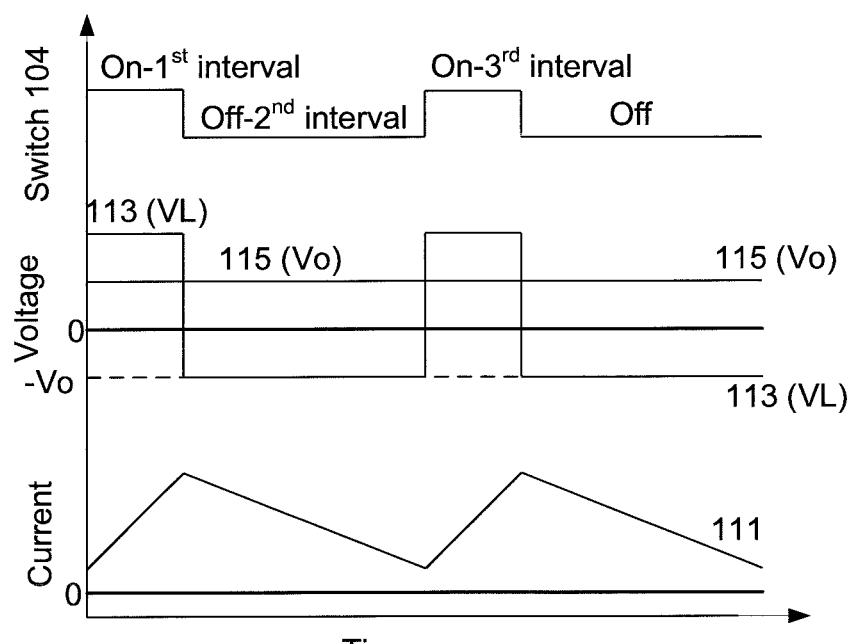
PRIOR ART FIG. 2

MULTIPHASE CONTROL SYSTEMS AND ASSOCIATED METHODS

FIELD

The present document pertains to the field of control systems for DC-DC converters having two or more phases.

BACKGROUND

Many electronic devices include sub-circuits, and one sub-circuit may have a voltage requirement that is different from another sub-circuit. For example, laptop computers and cell phones, the power to which is primarily supplied by batteries, may have sub-circuits that require a voltage that is lower or higher than the battery supply voltage. Instead of providing a different power source for each sub-circuit to accommodate the sub-circuits' differing voltage requirements, DC-DC converters are often employed. DC-DC converters convert an input DC voltage to a different output DC voltage.

A DC-DC converter may provide an output voltage that is lower than its input voltage, in which case, the converter is generally referred to as a step-down converter. Buck converters are commonly used as step-down converters. FIG. 1 illustrates a single phase buck converter 100, which includes a control switching device 104 (often referred to as an upper switching device in a buck converter), a lower switching device 108, and an inductor 106. During a first interval, upper switching device 104 is turned on, coupling a source voltage 102 to inductor 106, while lower switching device 108 remains turned off. A voltage 113 (VL) is created across inductor 106, and current 111 passing through inductor 106 feeds a load 110, which is connected in parallel with a filtering capacitor 112.

Inductor 106 stores energy in the magnetic field created by current flowing through the inductor during this first interval. Then, during a second interval, upper switching device 104 is turned off, severing the connection of inductor 106 with source voltage 102; but, because of the energy stored in inductor 106 during the first interval, current 111 continues to flow through inductor 106 and lower switching device 108, feeding load 110.

Current 111 through inductor 106 decreases during the second interval because the inductor is disconnected from source voltage 102. If upper switching device 104 is turned back on during a third interval before the current through inductor 106 reaches zero, converter 100 is said to be operating in continuous conduction mode. If, on the other hand, the current through inductor 106 falls to zero for part of the second interval, converter 100 is considered to be operating in discontinuous conduction mode. It is known that when driving a light load, a buck type DC-DC converter operating in discontinuous conduction mode may provide higher efficiency than a buck type DC-DC converter operating in continuous conduction mode.

Attention is now directed to FIG. 2, which illustrates the current and voltage waveforms relating to buck converter 100 operating in continuous conduction mode. For simplicity, the timing diagram in FIG. 2 (and the remaining figures) depicts ideal components. When inductor 106 is coupled to input voltage 102 by turning switching device 104 on during the first interval, current 111 through inductor 106 increases along with the energy stored in inductor 106. Subsequently, when upper switch 104 is turned off during the second interval, the energy stored in inductor 106 begins to decrease, along with current 111 passing through inductor 106. During this second interval, as shown, voltage 113 (VL) across inductor 106 is equal to the negative of output voltage 115 (Vo). As the buck converter 100 is operating in continuous conduction mode, before the current 111 reaches zero, switch 104 is turned on again during a third interval. Thus, as in the first interval, current 111 begins to rise, and inductor 106 starts to store energy; the process is continually repeated to provide a voltage 115 (Vo) that is stepped down from the source voltage 102. Filtering capacitor 112 acts as a filter to level the output, and may also provide power to load 110 during such time that inductor 106 is not conducting current.

A duty cycle D of switch 104 is the ratio of the first interval time, and the sum of the times of the first and second intervals. For example, where switch 104 is turned on for 3 microseconds, and then turned off for 9 microseconds, the duty cycle of switch 104 is 0.25. For a given input voltage 102, output voltage 115 (Vo) of the buck converter 100 increases linearly with increasing duty cycle D of upper switch 104.

It is known to couple two or more DC-DC buck subconverters in parallel to output larger currents, as shown in FIG. 3, where two DC-DC buck subconverters 202a, 202b are connected in parallel to drive a common load in a two phase DC-DC converter 200. Each buck subconverter 202a, 202b is sometimes referred to as a "phase" of DC-DC converter 200 when each subconverter operates at a particular offset timing relationship with respect to the other subconverters of the converter. In such situations, buck converter 200 is typically referred to as a "multiphase" buck converter. Offset timing between phases of a multiphase converter is sometimes referred to as "phasing."

Phase 202a has a control or upper switch 206a, a diode 208a, and an inductor 210a; phase 202b has a control or upper switch 206b, a diode 208b, and an inductor 210b. As can be seen from FIG. 3, the lower switch 108 (FIG. 1) in each phase 202a, 204a is replaced by diode 208a, 208b respectively, which decreases the cost and complexity of phases 202a, 202b, but may also lower their efficiency. Both phases 202a, 202b are tied at their respective inputs 212a, 212b to a voltage source 214. Outputs 216a, 216b of phases 202a, 202b respectively are both tied to a load 220, to which a filtering capacitor 222 is connected in parallel.

During a first interval, upper switch 206a of phases 202a is turned on, while upper switch 206b of phase 202b remains turned off. Current 224a passes through inductor 210a, thereby storing energy in a magnetic field of inductor 210a, and via output 216a, provides power to load 220. Then, during a second interval, upper switch 206a of phase 202a is turned off, severing the connection of inductor 210a with voltage source 214, while upper switch 206b of phase 202b is turned on, coupling inductor 210b to voltage source 214. Now, current 224b passes through inductor 210b, stores energy in its magnetic field, and provides power to load 220. Additionally, inductor 210a, by virtue of the energy stored in its magnetic field during the first interval, continues to provide power to load 220. However, the magnetic field of inductor 210a decays during this second interval, and consequently, current 224a passing through inductor 210a decreases. Next, during a third interval, either before or after current 224a through inductor 210a becomes zero, upper switch 206a is turned on again, while upper switch 206b is turned off, as in the first interval. Here, inductor 210a provides power to load 220 and stores energy in its magnetic field, while inductor 210b, which is now disconnected from source 214, continues to provide power to load 220 because of the energy that inductor 210b stored in its magnetic field during the second interval. In this way, all other things being equal, parallel buck phases 202a, 202b of FIG. 3 can provide a higher output current 221 to the load 220. Much like capacitor 112 of FIG. 1, filtering capacitor 222 of FIG. 3 is used to filter the ripple component at the output. FIG. 4 illustrates the current waveforms of currents 224a and 224b through inductors 210a, 210b respectively in relation to the state of upper switches 206a, 206b.

In addition to providing a higher output current 221, this 2 phase converter 200 has several other advantages over the single phase buck converter 100 of FIG. 1. Notably, because of the parallel configuration and the off-set timing of upper switches 206a, 206b, frequency of the ripple component generated thereby is effectively doubled, while the total ripple current amplitude at output 215 is decreased due to ripple current cancellation. The capacitance 222 required to filter out this ripple component is decreased, which, in turn, significantly decreases the overall system cost. This likewise stands true for a buck converter having more than two phases, wherein frequency of the ripple component is further increased with correct phasing, and ripple cancellation is also more effective.

It is also known that when inductors of a two (or more) phase buck converter are magnetically coupled to some degree, efficiency of the buck converter is improved, and the ripple is reduced. This is explained in U.S. Pat. No. 6,362,986 to Schultz et al., which is incorporated herein by reference. FIG. 5 shows a two phase buck converter 300, which, except for a magnetic core 301 manifesting the coupling of inductors 310a, 310b, is generally similar to two phase buck converter 200 of FIG. 3. Subconverter or phase 302a has a control or upper switch 306a, a diode 308a, and an inductor 310a; subconverter or phase 302b has a control or upper switch 306b, a diode 308b, and an inductor 310b. Both phases 302a, 302b are tied at their respective inputs 312a, 312b to a voltage source 314. Outputs 316a, 316b of phases 302a, 302b respectively are both tied to a load 320, to which a filtering capacitor 322 is connected in parallel.

The ideal waveforms of currents 324a and 324b through inductors 310a, 310b respectively in relation to the state of upper switches 306a, 306b of the buck converter 300 operating in continuous conduction mode are illustrated in FIG. 6. As shown, magnetic coupling of inductors 310a, 310b causes the current flowing from a switching node 326a into inductor 310a to induce a current flowing from a switching node 326b into inductor 310b. Similarly, magnetic coupling of inductors 310, 310b causes current flowing from switching node 326b into inductor 310b to induce a current flowing from switching node 326a into inductor 310a. A person skilled in the art will appreciate that because of this doubling of the effective switching frequency in a two-phase buck converter having two coupled inductors as compared to a two-phase buck converter having two discrete inductors, the peak to peak inductor ripple current (and output voltage ripple) in the coupled inductor buck converter 300 will be half than that of a buck converter 200 using discrete inductors, thereby simplifying or reducing capacitor sizes in ripple filtering circuitry.

SUMMARY

In an embodiment, a control system for regulating an output voltage of a DC-DC converter having N phases includes a pulse generator and a frequency divider, where N is an integer greater than one. The pulse generator generates a stream of fixed on-time pulses, where each pulse is triggered in response to current through an alternating one of the N phases falling to a threshold value. The frequency divider divides the stream of fixed on-time pulses into N phase signals for controlling the N phases of the DC-DC converter.

In an embodiment, a control system for regulating an output voltage of a DC-DC converter having N phases includes an error amplifier, a comparator, a pulse generator, and a frequency divider. N is an integer greater than one. The error amplifier outputs an error signal proportional to a difference between a reference voltage and the output voltage of the DC-DC converter, and the comparator compares the error signal to a signal representing current through an alternating one of the N phases. The pulse generator generates an output pulse in response to an output of the comparator, and the frequency divider alternatively activates the N phases in response to the output pulse.

In an embodiment, a method for regulating an output voltage of a DC-DC converter having N phases, where N is an integer greater than one, includes the following steps: (1) generating a stream of fixed on-time pulses, each pulse triggered in response to current through an alternating one of the N phases falling to a threshold value, and (2) dividing the stream of fixed on-time pulses into N phase signals for controlling the N phases of the DC-DC converter.

In an embodiment, a method of regulating an output voltage of a DC-DC converter having N phases, where N is an integer greater than one, includes the following steps: (1) generating an error signal proportional to a difference between a reference voltage and the output voltage of the DC-DC converter, (2) comparing the error signal to a signal representing current through an alternating one of the N phases to generate an output pulse, and (3) alternatively activating the N phases in response to the output pulse.

In an embodiment, a DC-DC converter includes N phases electrically coupled in parallel, where each phase includes a control switch electrically coupled to a terminal of an inductor of the phase. N is an integer greater than one. The DC-DC converter further includes a control system including a pulse generator and a frequency divider. The pulse generator generates a stream of fixed on-time pulses, where each pulse is triggered in response to current through an alternating one of the N phases falling to a threshold value. The frequency divider divides the stream of fixed on-time pulses into N alternatively asserted phase signals for respectively controlling the control switches of the N phases, to regulate an output voltage of the DC-DC converter.

BRIEF DESCRIPTION OF THE FIGURES

FIG. 1 is a schematic diagram of a PRIOR ART buck converter.

FIG. 2 is a timing diagram for the PRIOR ART buck converter of FIG. 1.

FIG. 7(a) illustrates a pulse stream generated by a pulse generator in the control system of FIG. 7.

DETAILED DESCRIPTION OF THE EMBODIMENTS

Figure 3:
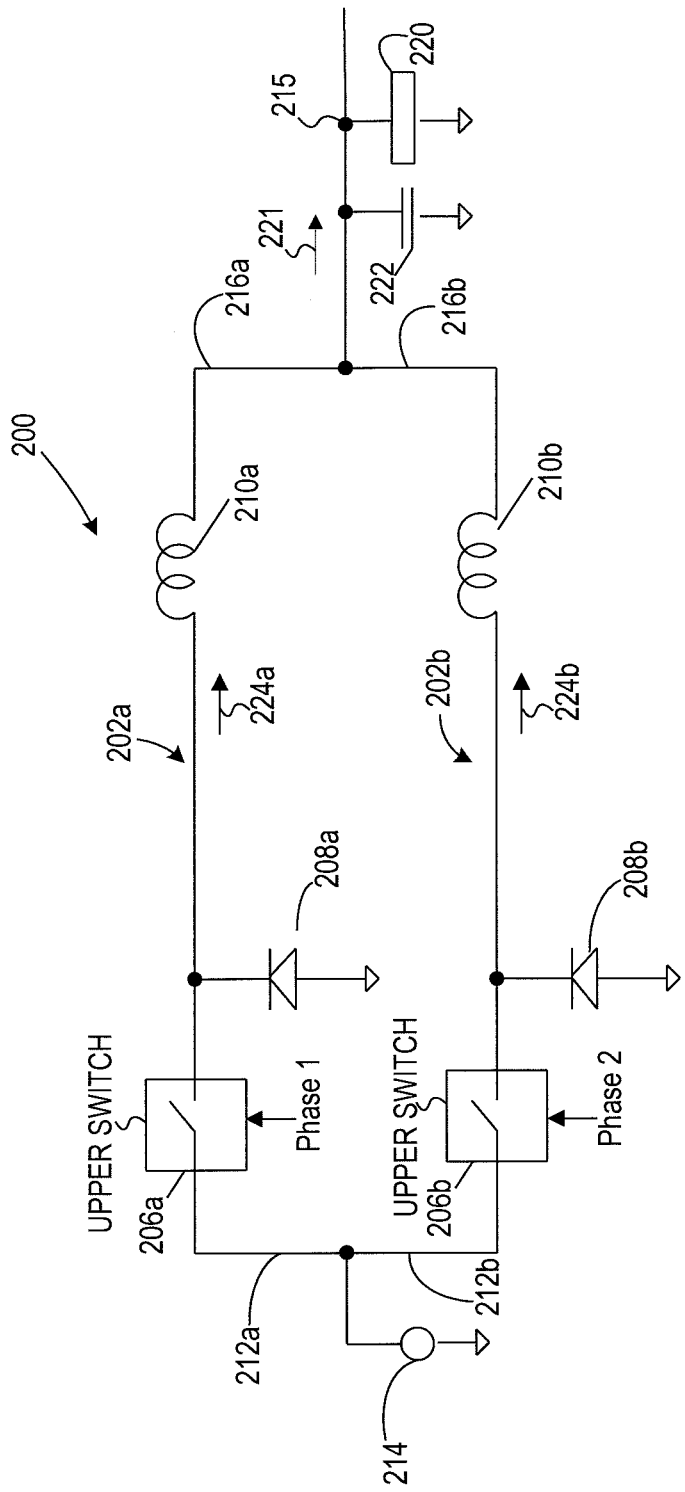
FIG. 3 is a schematic diagram of PRIOR ART parallel-connected buck subconverters having discrete inductors.
Figure 4:
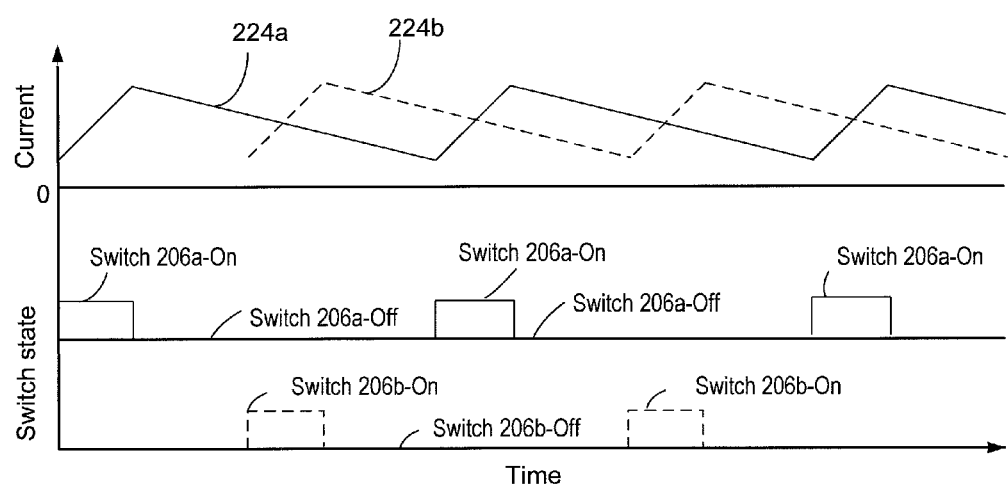
FIG. 4 is a timing diagram for the PRIOR ART parallel-connected buck subconverters of FIG. 3.

In ideal buck converters, assuming continuous conduction, output voltage 215, 315 is given by multiplying input voltage source 214, 314 by the duty cycle of upper switches 206a, 206b, and 306a, 306b respectively, i.e., Vo=D'*Vin, where Vin is the input voltage, Vo is the output voltage, and D is the duty cycle. In practical operation, it is generally necessary to control this duty cycle of switches 206a, 206b, and 306a, 306b to regulate output voltage 215, 315, as absent such regulation, due to, for example, system parasitic resistance, Vo would change as a function of load 220, 320; more specifically, as load 220, 320 draws more current 221, 321, the voltage drop across the parasitic resistance will increase, and consequently, output voltage 215, 315 will drop undesirably. Or, output voltage 215, 315 may fluctuate because of fluctuations in input source voltage 214, 314, requiring adjustment of the duty cycle of upper switches 206a, 206b, and 306a, 306b. Considering that the buck converters noted above are integral components of many electronic devices, and that these converters are generally manufactured in large volume, a simple and cost-effective method to control the duty cycles of switches 206a, 206b, and 306a, 306b to regulate output voltage 215, 315 may be significantly advantageous. This disclosure provides for such systems and methods.

Figure 5:
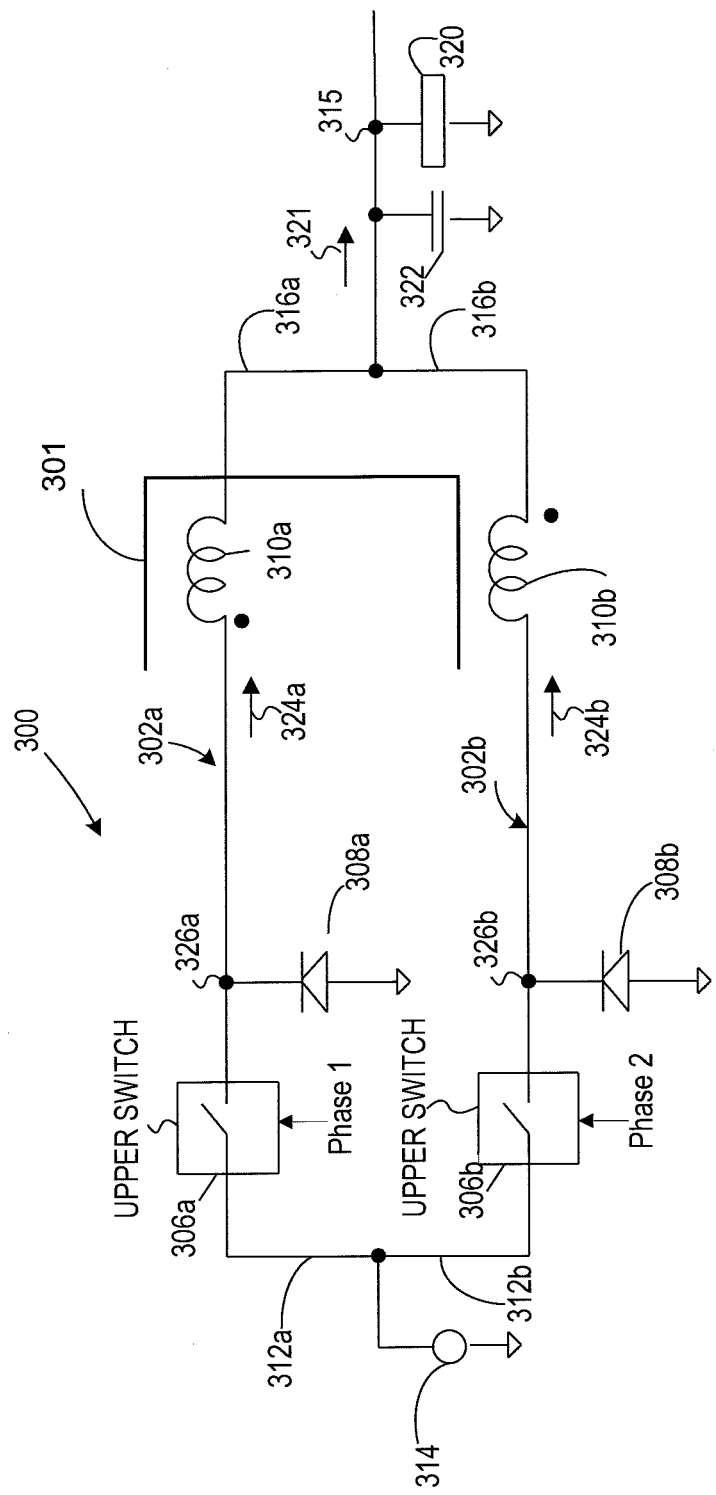
FIG. 5 is a schematic diagram of PRIOR-ART parallel-connected buck subconverters having coupled inductors to enhance efficiency.
Figure 6:
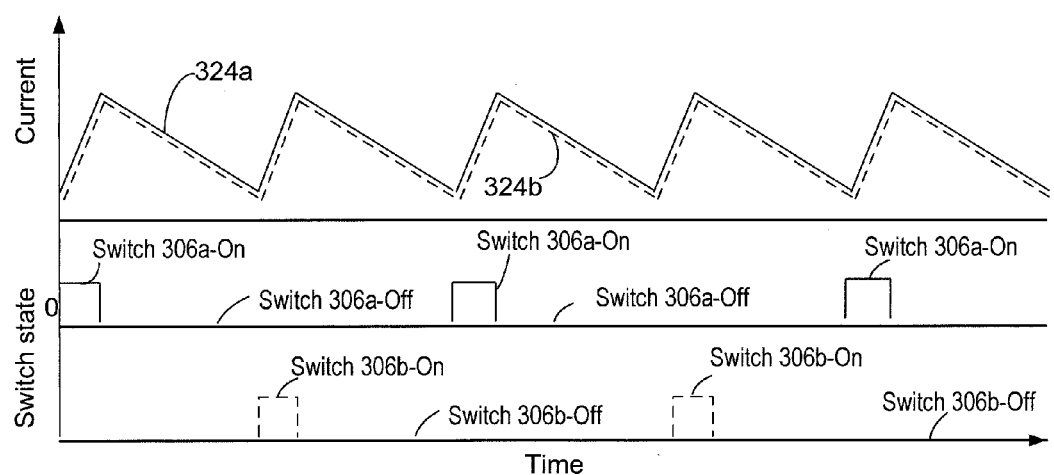
FIG. 6 is a timing diagram of the PRIOR-ART parallel-connected buck subconverters of FIG. 5.
Figure 7:
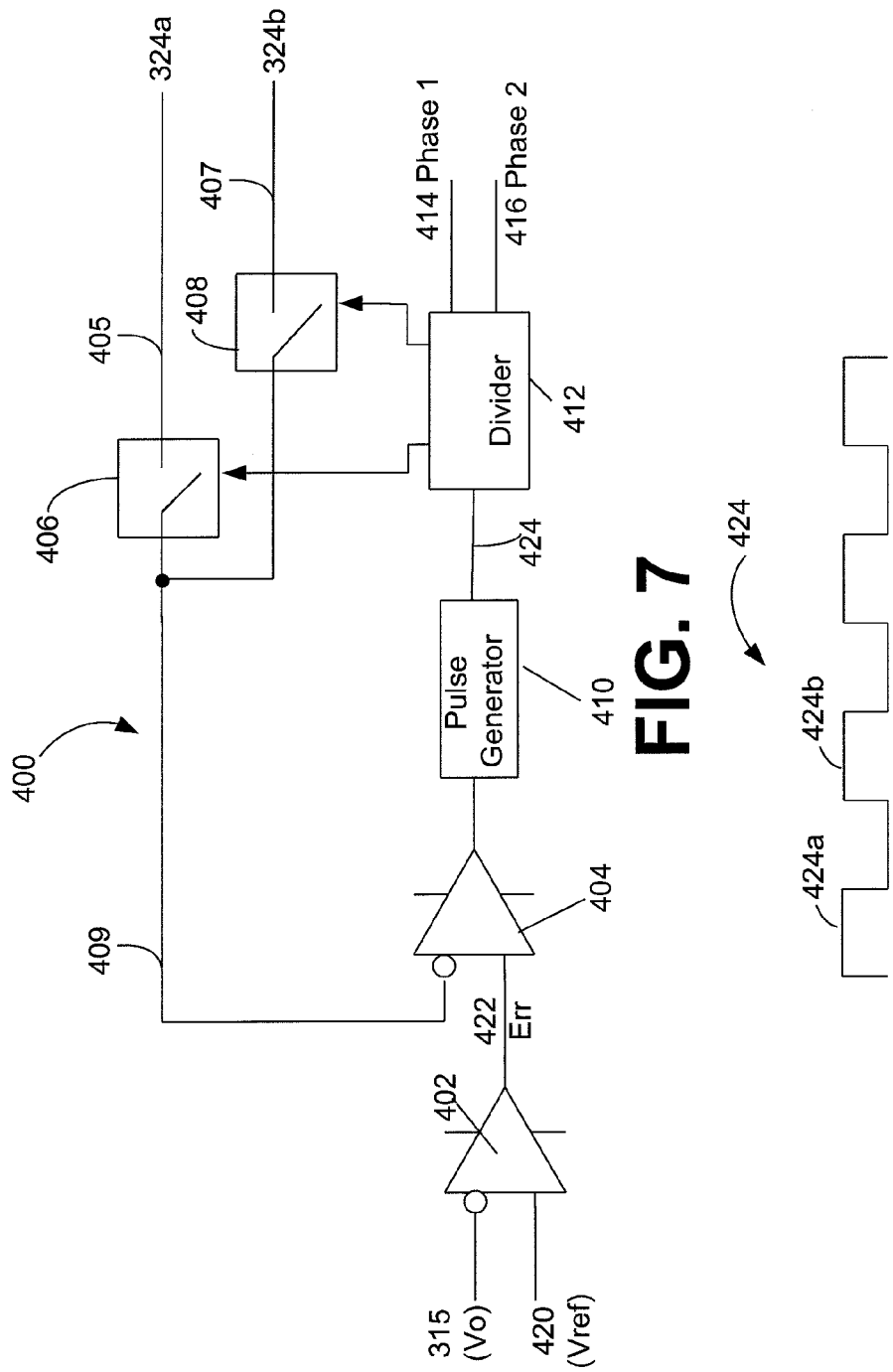
FIG. 7 is a schematic diagram of a control system for automatically controlling control switches in a DC-DC converter having more than one phase, according to an embodiment.

FIG. 7 depicts a control system 400, which will initially be detailed here with reference to two phase buck converter 300 of FIG. 5 having magnetically coupled inductors, 310a, and 310b. System 400 includes a voltage error amplifier 402, a current comparator 404, two switches 406, 408, a pulse generator 410, and a frequency divider 412.

Output 414 of frequency divider 412 controls upper switch 306a (Phase 1) of the parallel buck converter configuration 300, whereas output 416 controls upper switch 306b (Phase 2). As discussed, switches 306a, 306b are turned on alternatively, i.e., when upper switch 306a is turned on, upper switch 306b is turned off, and vice versa. The frequency divider 412 ensures that signals to these switches 306a, 306b are alternated, or in other words, that the phases 302a, 302b of buck converter 300 are alternatively activated.

To illustrate the system 400, consider that buck converter 300 is stepping down a source voltage 314 (FIG. 5) at 12.0 V DC to 2.0 V DC at output 315, and that output 315 is providing power to a processor (load 320). Then, the processor (load 320), which was previously asleep, is called on to perform certain tasks that require the processor (load 320) to draw additional current, such that output voltage 315 drops from 2.0 V to 1.9 V due to a voltage drop across system parasitic resistance. To maintain output voltage 315 at 2.0 V, system 400 first, at voltage error amplifier 402, determines the difference between output voltage 315 (Vo), currently at 1.9 V, and the desired 2.0 V, which in FIG. 7 is denoted by Vref 420. This difference, multiplied by a gain of voltage error amplifier 402, constitutes an Error signal 422 that is outputted by voltage error amplifier 402 and is proportional the difference between Vo and Vref 420. For simplicity, consider that the gain of voltage error amplifier 402 is 1, so the Error signal 422, Vref−Vo, equals 0.1 V. In certain embodiments, voltage error amplifier 402 will include components (not shown) to set amplifier gain and/or amplifier frequency response, such as to provide feedback loop compensation.

Error signal 422 provides a reference for current comparator 404, which in turn, signals pulse generator 410 to fire a pulse stream 424 (see FIG. 7a) with a pre-determined, fixed on-time. The fixed on-time of pulses in the pulse stream 424 controls the amount of time for which upper switches 306a, 306b are turned on. Specifically, pulse stream 424 is fed to frequency divider 412, which, at a first pulse 424a, turns on upper switch 306a, and at a second pulse 424b, turns on upper switch 306b. Thus, frequency divider 412 divides pulse stream 424 into phase signals 414, 416 for respectively controlling two phases 302a, 302b of buck converter 300. As the on-time of the pulses 424a, 424b is fixed, to increase the duty cycle of switches 306a, 306b to compensate for the drop in output voltage 315, the time between pulses 424a, 424b is decreased automatically by the system to decrease the off-time of the switches 306a, 306b. Consequently, output voltage 315 increases and gets progressively closer to Vref 420, 2.0 V in this example.

In certain embodiments, pulse generator 410 is implemented as a one-shot or a glitch generator.

Current sense signals 405, 407, representing current 324a, 324b through inductors 310a, 310b respectively, are communicatively coupled to current comparator 404 via switches 406, 408, as current sense signal 409. Switches 406, 408 are closed in an alternating fashion so that current sense signal 409 represents current through an alternating one of phases 302a and 302b. For example, switch 406 is closed for one switching cycle such that current sense signal 409 represents current 324a through phase 302a, switch 408 is closed in the next switching cycle such that current sense signal 409 represents current 324b through phase 302b, switch 406 is closed in the next switching cycle so that current sense signal 409 represents current 324a through phase 302a, and so on.

Current sense signals 405, 407 are generated using current sensing methods known in the art, such as by measuring voltage drop across optional current sensing resistors (not shown) in series with inductors 310a, 310b, by measuring voltage drop across inductors 310a, 310b, by measuring voltage drop across switches (e.g., due to Rds on in embodiments where switches are MOSFETS), or by measuring current through switches using techniques similar to those disclosed in U.S. Pat. No. 6,445,244 to Stratakos et al., which is incorporated herein by reference. In certain embodiments, switches 406, 408 are controlled by frequency divider 412, as shown in FIG. 7. In other embodiments, switches 406, 408 are controlled by circuitry (not shown) separate from frequency divider 412.

Although switches 406, 408 are shown as discrete components, switches 406, 408 may be part of a common circuit. In certain alternate embodiments, switches 406, 408 are replaced with analog multiplexing circuitry (e.g., an N to 1 multiplexer where N is the number of phases) generating current sense 409 signal from current sense signals 405, 407.

Current comparator 404 compares current sense signal 409 to error signal 422, such that comparator 404 fires when current sense signal 409 falls to the level of error signal 422. Thus, pulse generator 410 generates a stream 424 of fixed on-time pulses 424a, 424b in response to current 324a, 324b through an alternating one of phases 302a, 302b falling to a threshold value determined by error signal 422. The current through the inductors 310a, 310b, thus, can both be monitored and controlled by a single feedback loop.

Figure 8:
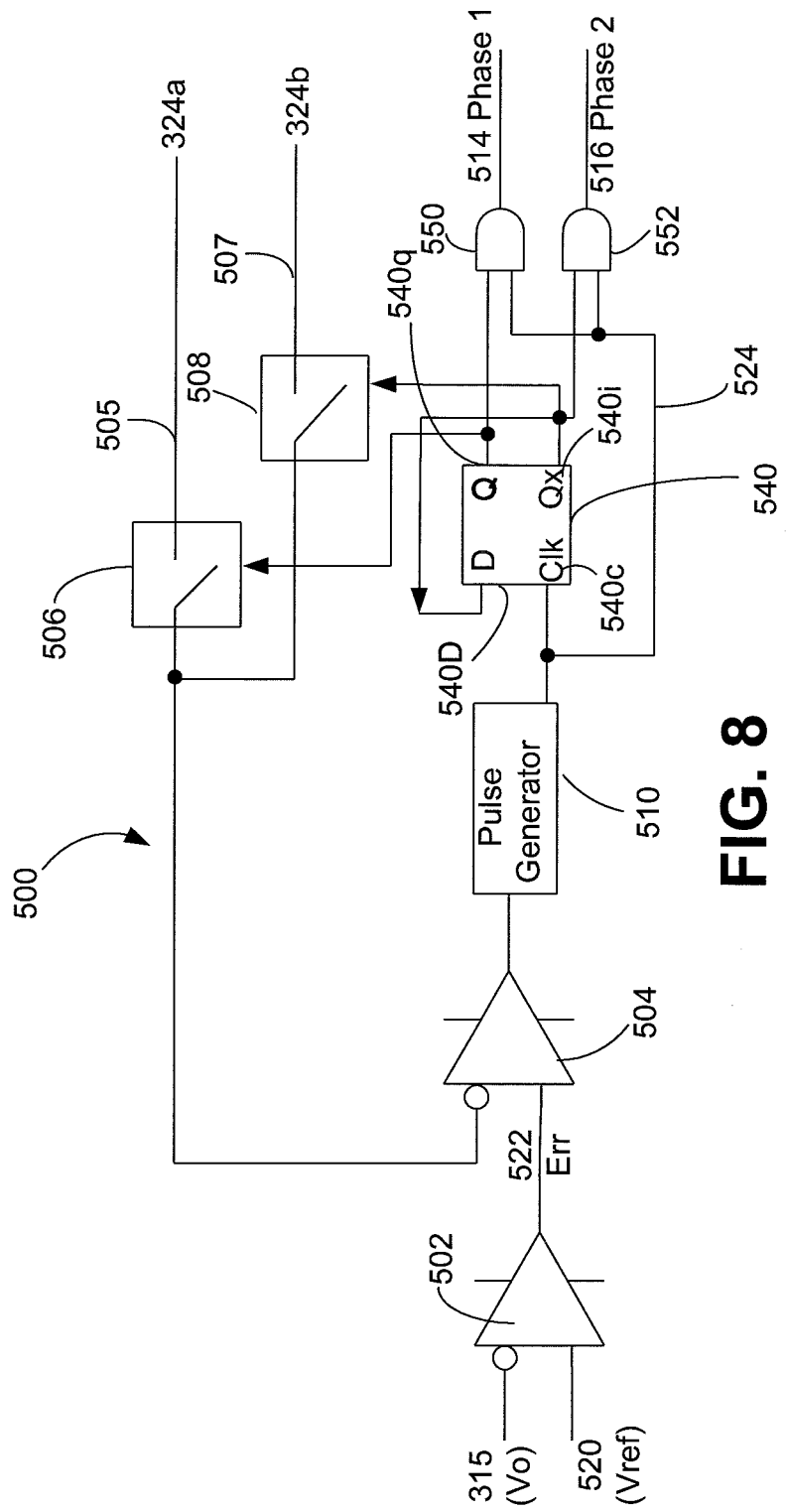
FIG. 8 is a schematic diagram of a certain embodiment of the control system of FIG. 7 wherein the frequency divider has been implemented by a D flip-flop and AND-gates.
Figure 9:
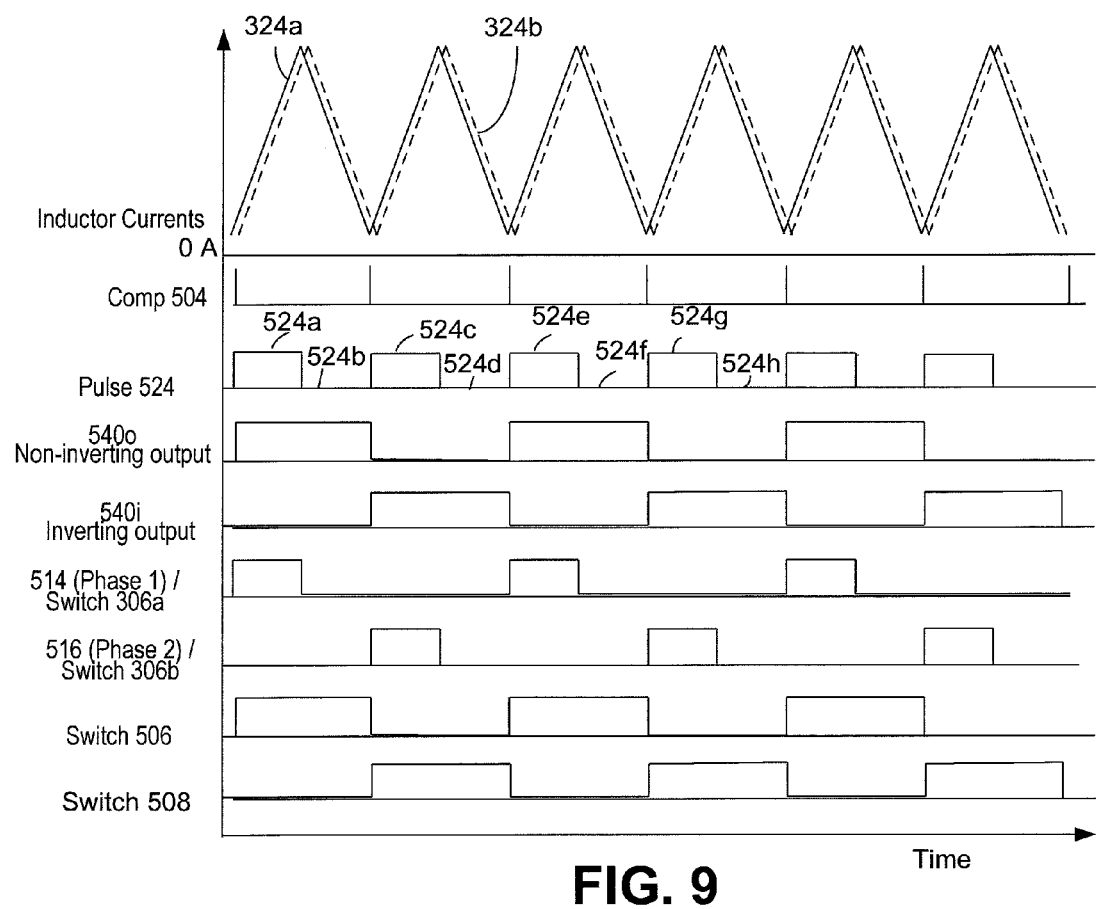
FIG. 9 is a timing diagram illustrating some of the pertinent waveforms of the control system of FIG. 8, when the control system is controlling a two phase buck converter having coupled inductors.

FIG. 8 shows a system 500 wherein frequency divider 412 of FIG. 7 has been implemented by a D flip flop 540 and two AND gates 550, 552. FIG. 9 illustrates some of the pertinent waveforms of system 500 of FIG. 8. D flip flop 540 has an input 540D, a non-inverting output 540q, an inverted output 540i, and a clock input 540c. Inverted output 540i is fed back to input 540D, which ensures that the frequency of non-inverting output 540q is half the frequency of clock 540c. Clock, 540c, is in turn tied to pulse generator 510. Consequently, the frequency of output 540q (and inverting output 540i) is half that of a pulse stream 524 (see FIG. 9) generated by pulse generator 510.

Non-inverting output 540q provides one of the inputs to AND gate 550, the output 514 of which AND gate 550 controls upper switch 306a (Phase 1). Pulse stream 524 provides the other input to AND gate 550. Non-inverting output 540q also controls switch 506, which couples a signal 505 representing current 324a through inductor 310a to the current comparator 504.

Similarly, inverting output 540i provides one of the inputs to AND gate 552, an output 516 of which AND gate 552 controls upper switch 306b (Phase 2). Pulse stream 524 provides the other input to AND gate 552. Switch 508 is also controlled by inverting output 540i, and is turned on at half the frequency of pulse stream 524 generated by pulse generator 510. Thus, switch 508 couples a signal 507 representing current 324b through inductor 310b to current comparator 504. In effect, switch 508 is turned on, and remains on while phase 302b is active, i.e., until upper switch 306a is turned on again, even though upper switch 306b may have already turned off (see FIG. 9).

Voltage error amplifier 502 determines an error signal 522 proportional to a difference between output voltage 315 (Vo) and Vref 520. Comparator 504, which is tied to pulse generator 510, fires and causes pulse generator 510 to generate pulse stream 524, which pulse stream 524 is fed to clock 540c of D flip-flop 540. As shown, pulse stream 524 has a first, second, third, and fourth high level 524a, 524c, 524e, and 524g respectively, and a first, second, third and fourth low level 524b, 524d, 524f, and 524h respectively, and so on. Because input 540D of flip-flop 540 is tied to inverting output 540i, non-inverting output 540q is high for pulse 524 first high and low levels 524a, 524b, and then non-inverting output 540q is low for both pulse high and low levels 524c, 524d.

Non-inverting output 540q is then fed to AND gate 550, along with pulse stream 524—as a result, output 514 of AND gate 550 turns on upper switch 306a (FIG. 5) for pulse first high level 524a. At pulse first low level 524b, both upper switches 306a, 306b are off Output 540q also turns on switch 506 for pulse first high and low level 524a, 524b, so that current through inductor 310a is sensed and fed to comparator 504 as current sense signal 505 for pulse first high and low levels 524a, 524b.

Then, at pulse second high and low levels 524c, 524d, inverting output 540i is at a high level. Consequently, signal 516 (Phase 2) outputted by AND gate 552 is high for pulse second high level 524c, turning on switch 306b. The switch 306b is subsequently turned off during pulse second low level 524d. During pulse second high and low levels 524c, 524d, switch 508 is also turned on, allowing comparator 504 to sense current sense signal 507 representing current 324b through inductor 310b. Switch 306a, which had turned off at the end of pulse first high level 524a, remains off until pulse third high level 524e, and subsequently, at pulse fourth high level 524g, switch 306b is turned on, and the process automatically continues.

Figure 10:
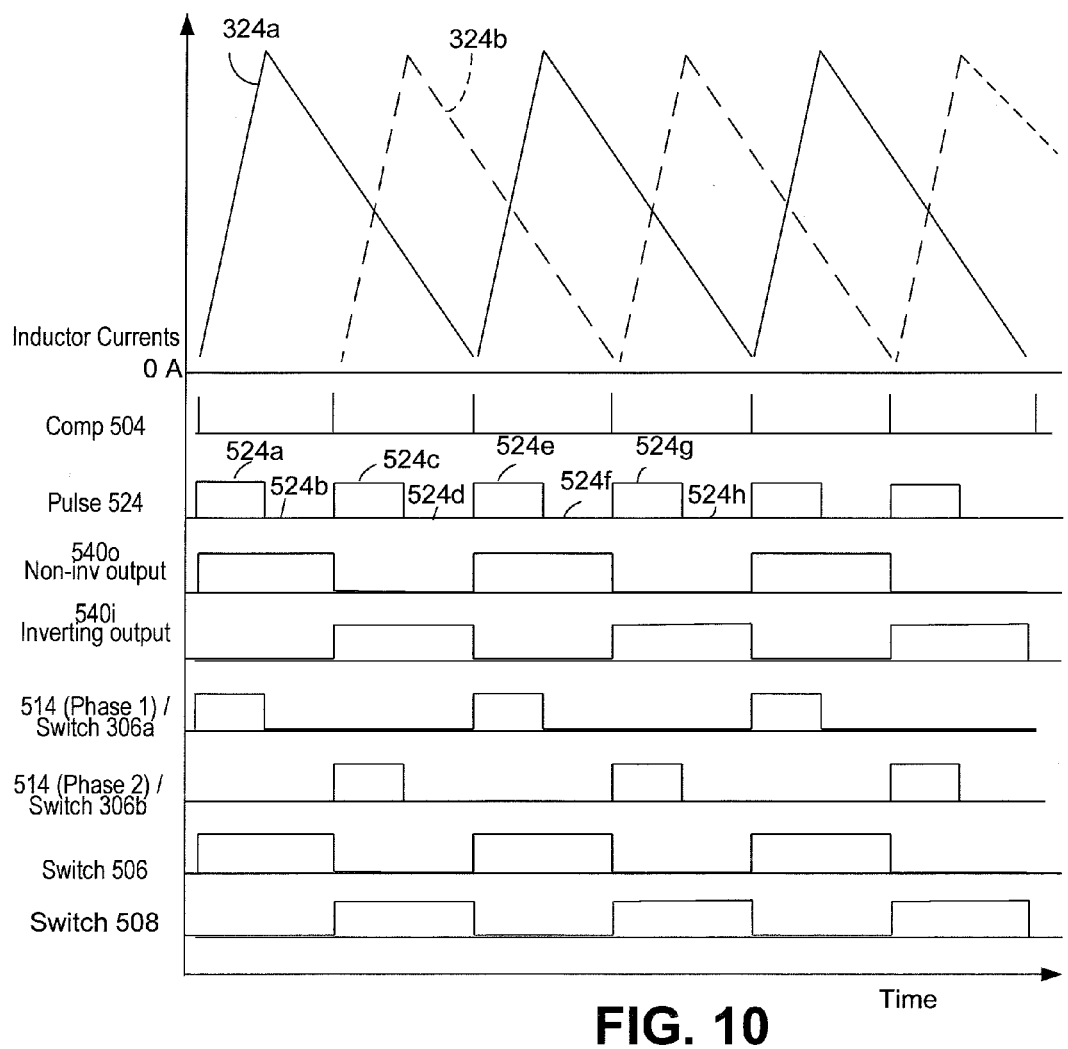
FIG. 10 is a timing diagram illustrating some of the pertinent waveforms of the control system of FIG. 8, when the control system is controlling a two phase buck converter having discrete inductors.

As can be seen in FIG. 9, current 324a through inductor 310a increases along with current 324b when upper switch 306b is turned on, even though upper switch 306a is then off. This is because of the magnetic coupling of inductors 310a, 310b, which ensures that currents 324a, 324b track each other, even when only one of inductors 310a, 310b is coupled to voltage source 314 at one time. If inductors 310a, 310b were not magnetically coupled (see, for example, system 200 of FIG. 3), the resulting waveforms would appear as in FIG. 10, wherein current 324a through inductor 310a would rise when upper switch 306a is turned on by output 514, and would continue to fall thereafter until upper switch 306a is turned on again. Likewise, current 324b through inductor 310b would rise when upper switch 306b is turned on by output 516, and would continue to fall until upper switch 306b is turned on again, irrespective of current 324 and upper switch 306a.

Whether a two-phase buck converter uses discrete or coupled inductors, system 500, thus, provides a simple and cost-effective method to automatically alternate and control the switching of upper switches 306a, and 306b without the need for a phase lock loop or other significant circuitry.

Variations of system 500 are possible. For example, D flip-flop 540 could be replaced with discrete components performing a similar function, in certain alternate embodiments. Additionally, the term "AND gate" as used herein refers to logic circuitry performing the AND function. Since logic polarity may vary throughout a circuit and even pulses from the pulse generator may be defined by a designer to be active high or active low, an invert-OR-invert combination is equivalent to an AND gate, and such AND functions may be implemented with combinations of NAND, NOR, inverters, and even OR gates. All such implementations of an AND function are incorporated into the term "AND gate" as used herein.

System 400 can also be extended to automatically control the duty cycle of upper switches in a multiphase buck converter having more than two phases, by adding, for example, one or more additional switches coupling current sense signals to current comparator 404, and by replacing frequency divider 412 with a frequency divider that divides pulse stream 424 into three or more alternately activated phase signals for controlling upper switches of three or more phases.

Figure 11:
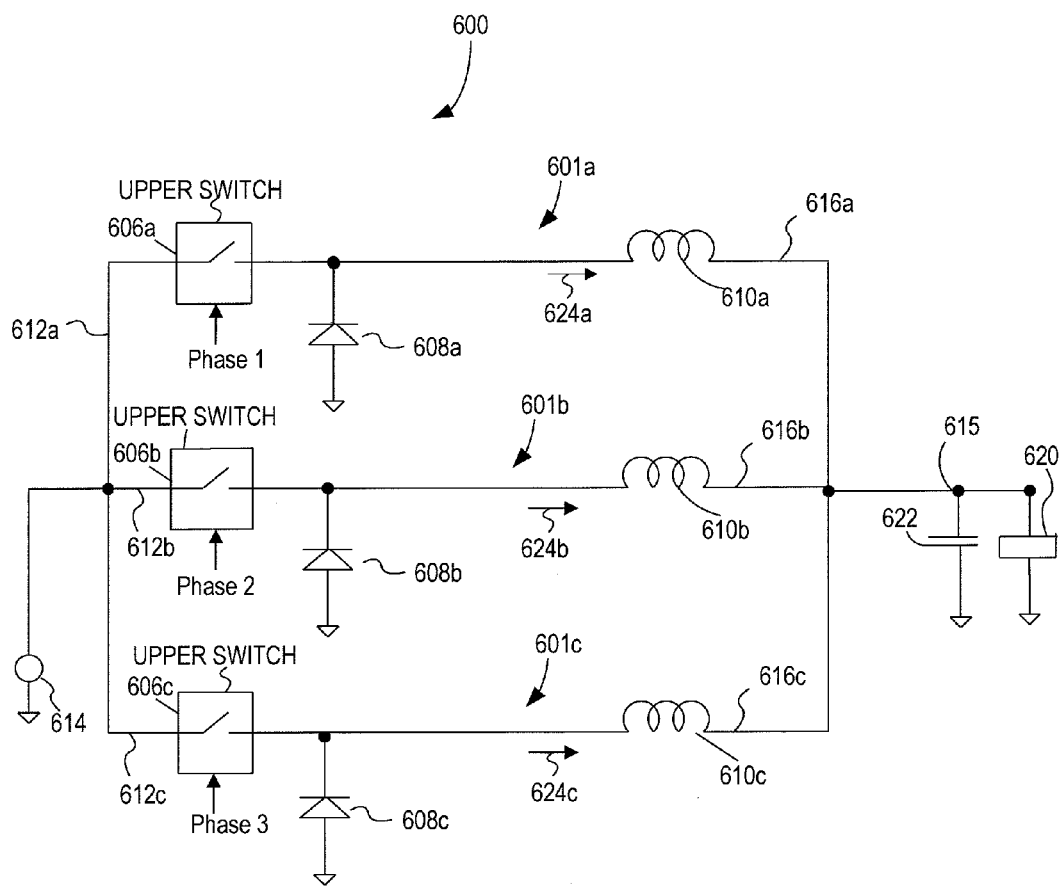
FIG. 11 is a schematic diagram of a PRIOR-ART three phase buck converter having discrete inductors.

Consider a three-phase buck converter 600 using discrete inductors 610a, 610b, and 610c for phase 601a, phase 601b, and phase 601c respectively, as shown in FIG. 11. Phase 601a has a control or upper switch 606a, a diode 608a, and an inductor 610a; phase 601b has a control or upper switch 606b, a diode 608b, and an inductor 610b; phase 601c has a control or upper switch 606c, a diode 608c, and an inductor 610c.

Each of phases 601a, 601b, 601c are tied at their respective inputs 612a, 612b, 612c to a voltage source 614. Outputs 616a, 616b, 616c of phases 601a, 601b, 601c are tied to a load 620, to which a filtering capacitor 622 is connected in parallel. Here, system 700 (FIG. 12) can be used to automatically alternate and control the switching of upper switches 606a, 606b, and 606c.

Figure 13:
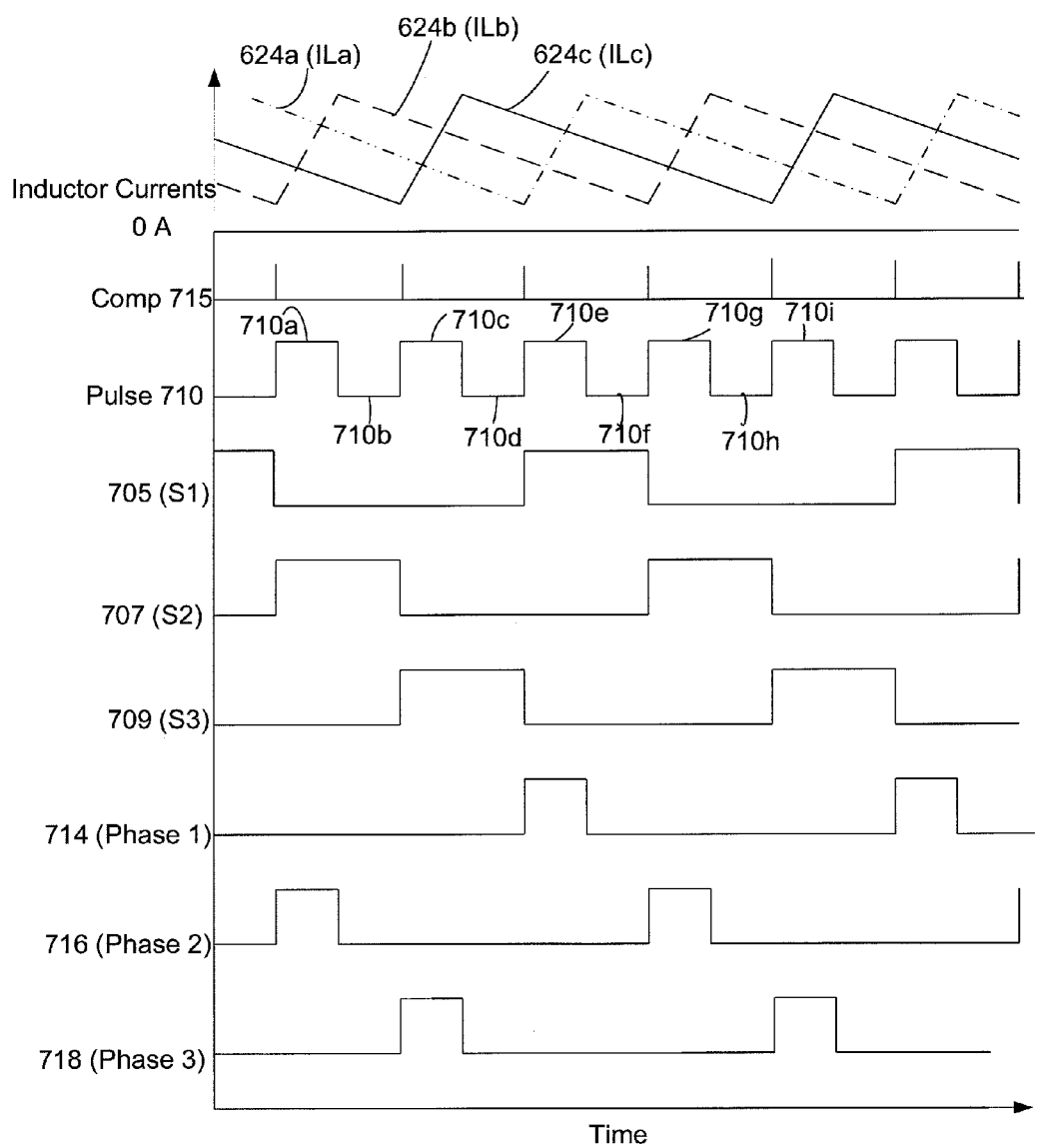
FIG. 13 is a timing diagram illustrating some of the pertinent waveforms for the control system of FIG. 12, when it is controlling the three phase buck converter of FIG. 11.

Specifically, voltage error amplifier 702 outputs an error signal 722, i.e., the difference between output voltage 615 (Vo) and reference voltage 620 (Vref) multiplied by the gain of amplifier 702, and feeds this error signal 722 to comparator 704. Comparator 704, which is tied to pulse generator 711, fires and generates a comparator signal 715 causing pulse generator 711 to output a pulse stream 710, with a first, second, third, fourth and fifth high levels 710a, 710c, 710e, 710g, 710i, and first, second, third and fourth low levels 710b, 710d, 710f, 710h respectively (see FIG. 13). Pulse stream 710 is in-turn fed to a clock input of two JK flip-flops 780, 782. Flip-flops 780, 782, in conjunction with an inverter 784, are arranged such that flip-flops 780, 782 produce outputs 705 (S1), 707 (S2), and 709 (S3) that are each at one-third of a frequency of the pulse stream 710, have a duty cycle of approximately 33%, and are staggered. These outputs 705 (S1), 707 (S2), and 709 (S3) are then inputted to AND gates 750, 752, and 754 respectively, pulse stream 724 providing the other input to all of the three AND gates. As in system 500 of FIG. 8, outputs 714, 716, 718 of these AND gates 750, 752 and 754 control upper switches 606a (Phase 601a), 606b (Phase 601b), and 606c (Phase 601c) respectively of the three phase buck converter 600. Thus, upper switch 606a is turned on for pulse high level 710e, upper switch 606b is turned on for the next pulse high level 710g, and upper switch 606c is turned on for the subsequent pulse high level 710i. Additionally, outputs 705 (S1), 707 (S2), and 709 (S3) also control switches 706, 707, and 708, allowing current comparator 704 to cyclically monitor current sense signals 761, 762, 763 respectively representing inductor currents 624a, 624b, and 624c of the three phases. System 700, hence, provides a method to automatically alternate the upper switches 606a, 606b, and 606c of Phase 601a, 601b, 601c, respectively, and to monitor currents 624a, 624b, 624c of the three phases with a single feedback loop, without any significant circuitry.

Variations of control system 700 are possible. For example, in an alternate embodiment JK flip-flops 780, 782 may be replaced with another type of flip-flop.

Figure 14:
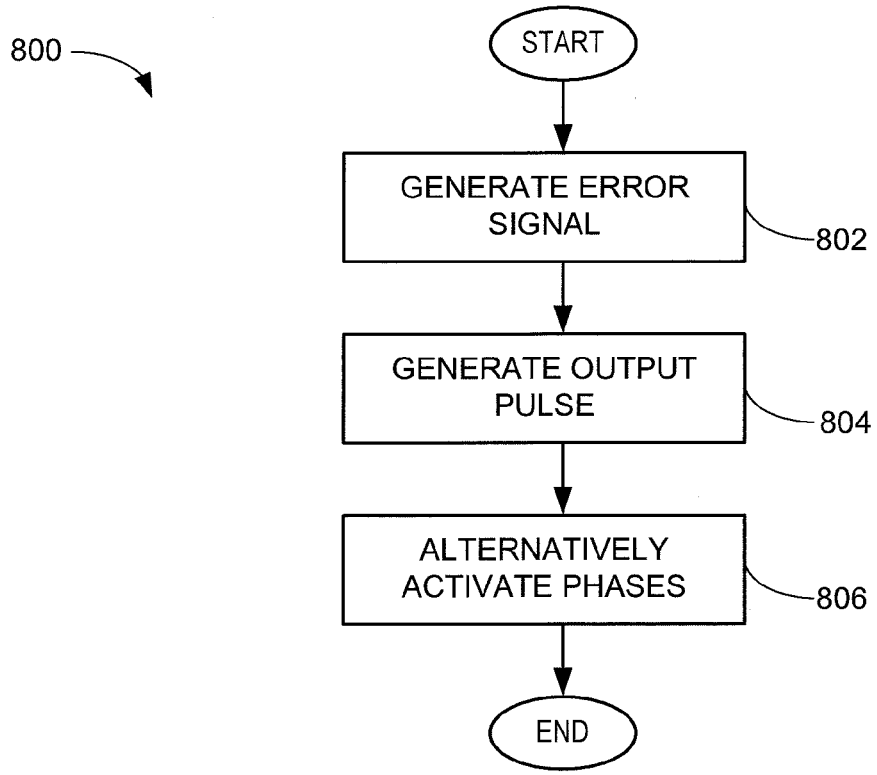
FIG. 14 is a flow chart of a method for regulating an output voltage of a DC-DC converter, according to an embodiment.

FIG. 14 shows a method 800 for regulating an output voltage of a DC-DC converter having N phases, where N is an integer greater than 1. Method 800 begins with step 802 of generating an error signal that is proportional to a difference between a reference voltage and the output voltage of the DC-DC converter. An example of step 802 is using error amplifier 502 (FIG. 8) to generate error signal 522 that is proportional to the difference between Vref 520 and Vo 315. Next, at step 804, an output pulse is generated by comparing the error signal to a signal representing current passing through an alternating one of the N phases. An example of step 804 is using current comparator 504 to compare error signal 522 with a signal representing current (e.g., either current 324a or 324b depending on whether Phase 1 or 2 respectively is active) passing through the active one of the N phases, and causing pulse generator 510, which is coupled to the output of the current comparator 504, to generate an output pulse (e.g. pulse 524c). At step 806, the N phases are alternatively turned on in response to the output pulse. An example of this step is using D flip-flop 540, arranged as shown in FIG. 8, to alternatively control upper switches 306a, 306b (FIG. 5), such that if switch 306a was turned on in response to the previous output pulse (e.g., pulse 524a), switch 306b is turned on at the subsequent pulse (e.g., pulse 524c), and so forth.

Figure 12:
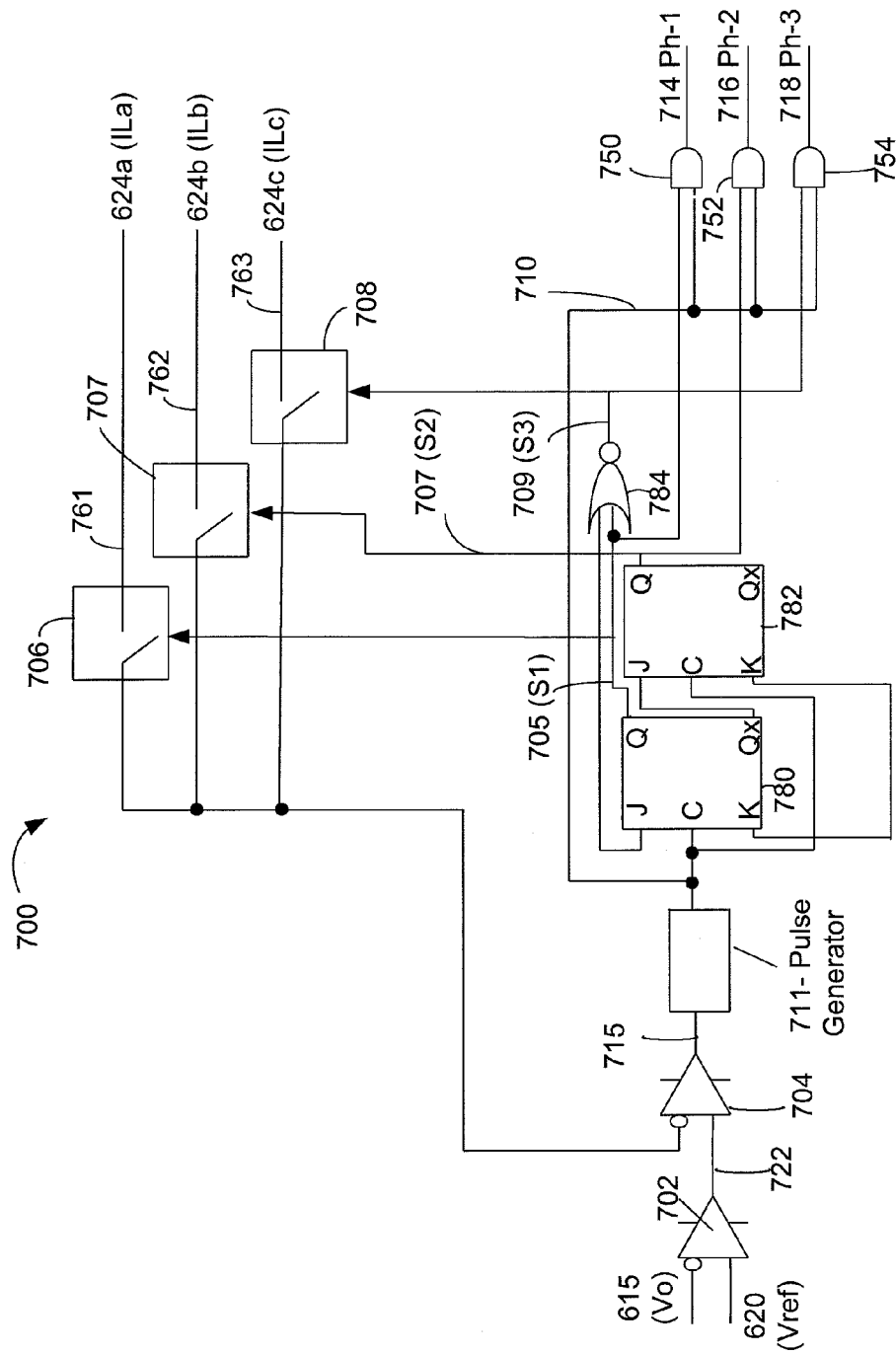
FIG. 12 is a schematic diagram of a control system for automatically controlling phases of a three phase buck converter, according to an embodiment.
Figure 15:
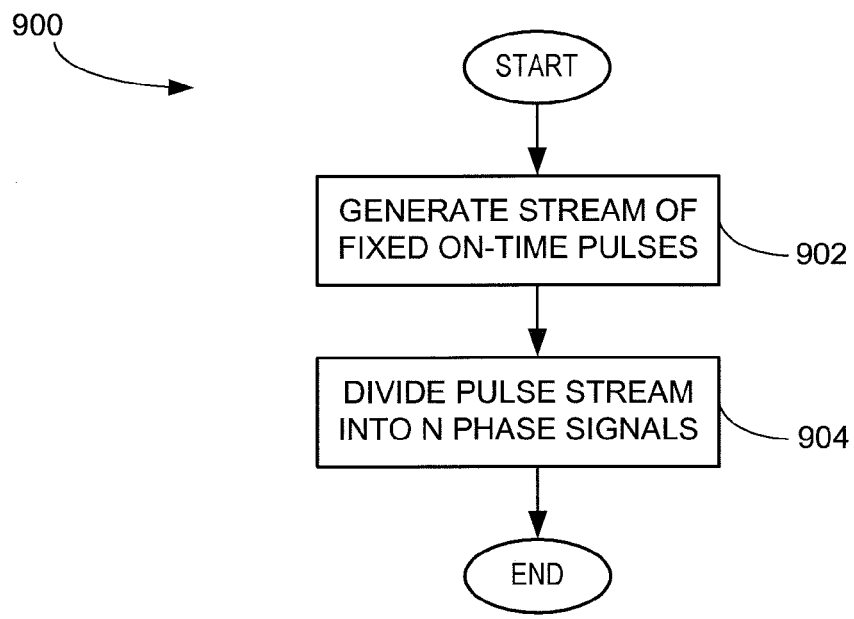
FIG. 15 is flow chart of another method for regulating an output voltage of a DC-DC converter having N phases, according to an embodiment.

FIG. 15 shows a method 900 for regulating an output voltage of a DC-DC converter having N phases, N being an integer greater than one. Method 900 begins at step 902 with the generation of a stream of fixed on-time pulses, each pulse triggered in response to current through an alternating one of the N phases falling to a threshold value. An example of step 902 is using current comparator 704 (FIG. 12) to trigger pulse generator 711 to generate pulse stream 710. At step 904, the fixed on-time pulse stream is divided into N phase signals, each phase signal controlling and alternatively activating one of the N phases. An example of step 904 is using two JK flip-flops 780, 782, inverter 784, and AND gates 750, 752, 754 arranged as shown in FIG. 12, to divide the pulse steam (e.g., having pulses 710a, 710c, 701e) into phase signals 714, 716, 718, such that each pulse activates a different one of phases 601a, 601b, 601c.

While system 700 is illustrated herein using a multiphase buck converter 600 having discrete inductors 610a, 610b, and 610c, a person skilled in the art will appreciate that system 700 can also be used to automatically control the three phases of a multiphase buck converter having coupled inductors, and with minor modifications, multiphase buck converters having more than three phases. Additionally, while systems 400, 500, and 700 have been detailed here in connection with multiphase buck converters, such systems 400, 500, and 700, as well as methods 800 and 900, can also be used to control the phases (i.e., control switches) in other topologies, such as multiphase boost, multiphase buck-boost, etc., with or without magnetic coupling of energy storage inductors.

Figure 16:
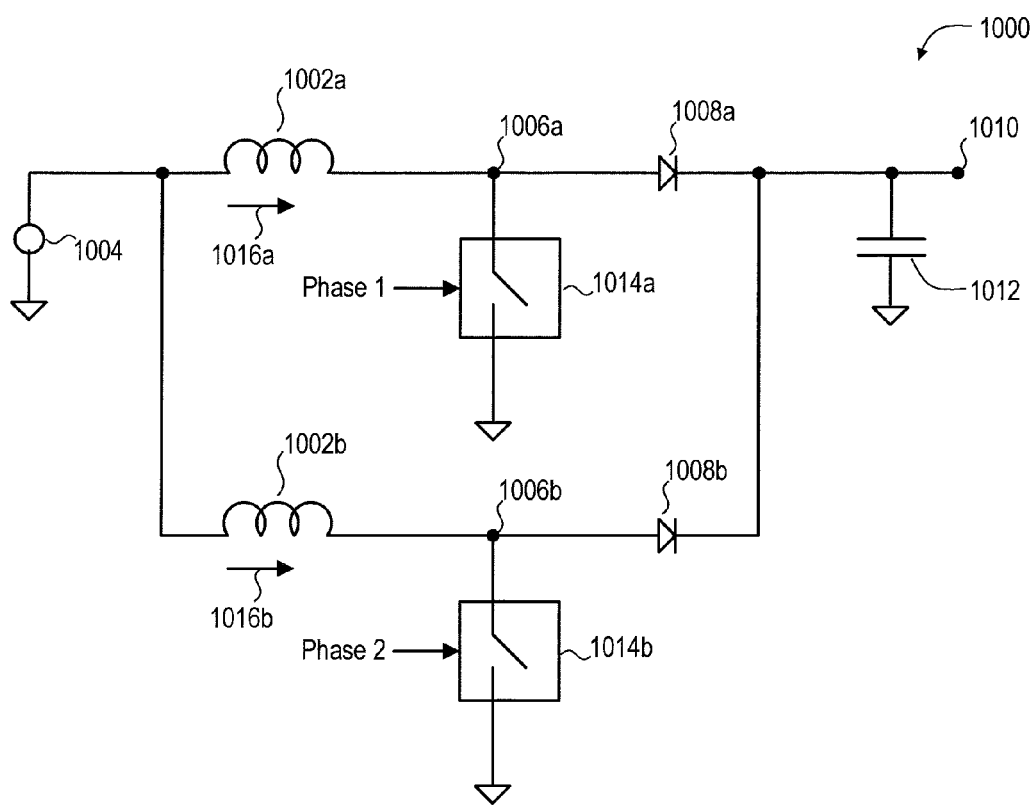
FIG. 16 is a schematic diagram of PRIOR ART two phase boost converter having discrete inductors.

For example, FIG. 16 shows a prior art two phase boost converter 1000 including inductors 1002a, 1002b electrically coupled between an input voltage source 1004 and respective switching nodes 1006a, 1006b. Diodes 1008a, 1008b electrically couple switching nodes 1006a, 1006b to an output 1010, and an output filter 1012 is also electrically coupled to output 1010. Control switches 1014a, 1014b are electrically coupled between switching nodes 1006a, 1006 and ground. Control system 400 (FIG. 7) could be adapted to control boost converter 1000. In particular, Phase 1 and Phase 2 signals 414, 416 of system 400 would respectively control switches 1014a, 1014b, as shown in FIG. 16, and signals representing currents 1016a, 1016b through inductors 1002a, 1002b would be respectively coupled to switches 406, 408.

Figure 17:
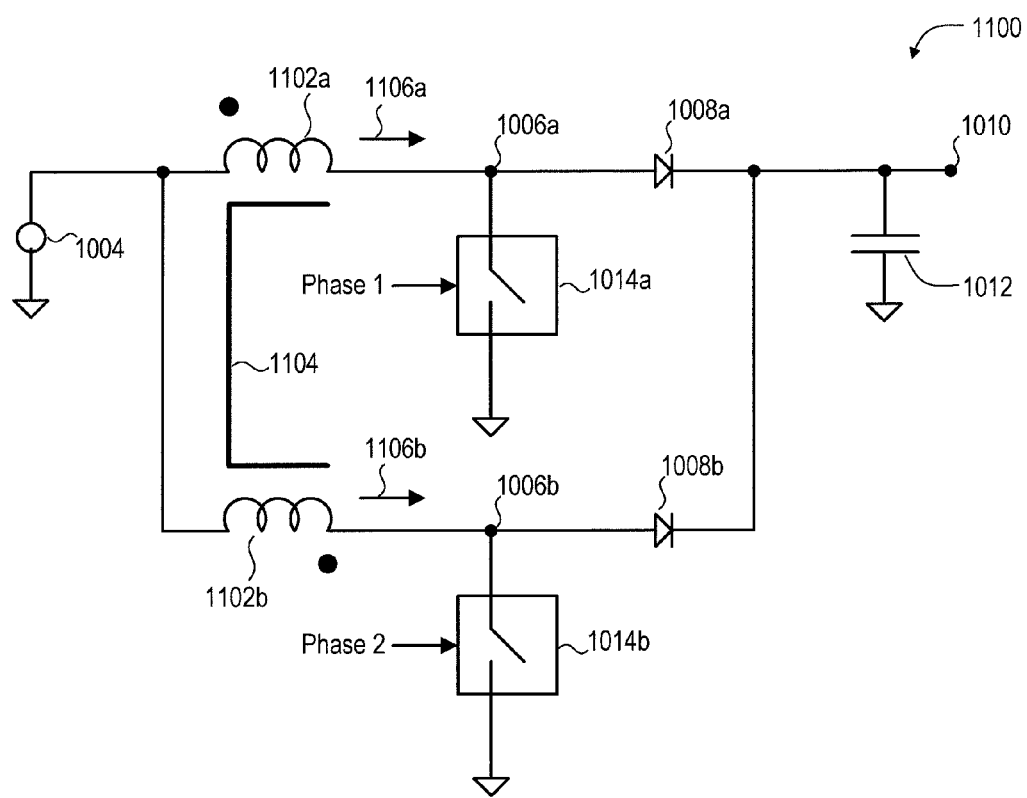
FIG. 17 is a schematic diagram of PRIOR ART two phase boost converter having coupled inductors.

As another example, FIG. 17 shows a prior art two phase boost converter 1100. Boost converter 1100 is the same as boost converter 1000 (FIG. 16), but includes inductors 1102a, 1102b magnetically coupled by a magnetic core 1104, instead of discrete inductors. Control system 400 could also be adapted to control boost converter 1100. In particular, Phase 1 and Phase 2 signals 414, 416 of system 400 would respectively control switches 1014a, 1014b, as shown in FIG. 17, and signals representing currents 1106a, 1106b through inductors 1102a, 1102b would be respectively coupled to switches 406, 408.

Systems 400, 500, and 700 and methods 800 and 900 can also be used in connection with isolated topologies, such multiphase isolated full bridge, multiphase isolated half bridge, multiphase push-pull, etc., with or without magnetic coupling of energy storage inductors. For example, systems 400, 500, and 700 and methods 800 and 900 could be adapted to control multiphase converters disclosed in U.S. Pat. No. 7,239,530 to Djekic et al., which is incorporated herein by reference.

Changes may be made in the above methods and systems without departing from the scope hereof. Therefore, the matter contained in the above description and shown in the accompanying drawings should be interpreted as being illustrative, and not limiting. The following claims are intended to cover generic and specific features described herein, as well as statements of the scope of the present method and systems, which, as matter of language, might be said to fall therebetween.

What is claimed is:

1. A control system for regulating an output voltage of a DC-DC converter having N phases, N being an integer greater than one, the control system comprising:
   a pulse generator for generating a stream of fixed on-time pulses, each pulse triggered in response to current through an alternating one of the N phases falling to a threshold value; and
   a frequency divider for dividing the stream of fixed on-time pulses into N phase signals for controlling the N phases of the DC-DC converter.

2. The control system of claim 1, further comprising an error amplifier operable to determine the threshold value from a difference between a reference voltage and the output voltage of the DC-DC converter.

3. A control system for regulating an output voltage of a DC-DC converter having N phases, N being an integer greater than one, the control system comprising:
   an error amplifier for outputting an error signal proportional to a difference between a reference voltage and the output voltage of the DC-DC converter;
   a comparator for comparing the error signal to a signal representing current through an alternating one of the N phases;
   a pulse generator for generating an output pulse in response to an output of the comparator; and
   a frequency divider alternatively activating the N phases in response to the output pulse.

4. The control system of claim 3, further comprising N switches communicatively coupling the signal representing current through an alternating one of the N phases to the comparator.

5. The control system of claim 4, wherein:
   N is equal to two; and
   the frequency divider comprises:
      a flip-flop coupled to the pulse generator,
      a first AND gate having inputs coupled to the pulse generator and the flip-flop, an output of the first AND gate controlling a control switch of a first one of the N phases, and
      a second AND gate having inputs coupled to the pulse generator and the flip-flop, an output of the second AND gate controlling a control switch of a second one of the N phases.

6. The control system of claim 5, the N switches being controlled by the flip-flop.

7. The control system of claim 4, wherein:
   N is equal to three; and
   the frequency divider comprises first and second flip-flops and an inverter, both of the flip-flops being coupled to the pulse generator.

8. The control system of claim 7, the frequency divider further comprising a first, a second, and a third AND gate, outputs of the first, second and third AND gates respectively controlling a control switch of a first, second, and third one of the N phases of the DC-DC converter, and wherein:
   inputs of the first AND gate are coupled to the first flip-flop and the pulse generator;
   inputs of the second AND gate are coupled to the second flip-flop and the pulse generator; and
   inputs of the third AND gate are coupled to the inverter and the pulse generator.

9. The control system of claim 8, wherein:
   the first flip-flop controls a first one of the N switches;
   the second flip-flop controls a second one of the N switches; and
   the inverter controls a third one of the N switches.

10. The control system of claim 1, wherein the DC-DC converter is selected from the group consisting of a multiphase buck converter, a multiphase boost converter, a multiphase buck-boost converter, a multiphase isolated full bridge converter, a multiphase isolated half bridge converter, and multiphase push-pull converter.

11. A method for regulating an output voltage of a DC-DC converter having N phases, N being an integer greater than one, the method comprising the steps of:
   generating a stream of fixed on-time pulses, each pulse triggered in response to current through an alternating one of the N phases falling to a threshold value; and
   dividing the stream of fixed on-time pulses into N phase signals for controlling the N phases of the DC-DC converter.

12. The method of claim 11, further comprising determining the threshold value from a difference between a reference voltage and the output voltage of the DC-DC converter.

13. A method of regulating an output voltage of a DC-DC converter having N phases, N being an integer greater than one, the method comprising the steps of:
   generating an error signal proportional to a difference between a reference voltage and the output voltage of the DC-DC converter;
   comparing the error signal to a signal representing current through an alternating one of the N phases to generate an output pulse; and
   alternatively activating the N phases in response to the output pulse.

14. The method of claim 13, wherein the DC-DC converter is selected from the group consisting of a multiphase buck converter, a multiphase boost converter, a multiphase buck-boost converter, a multiphase isolated full bridge converter, a multiphase isolated half bridge converter, and multiphase push-pull converter.

15. The method of claim 13, wherein alternatively activating the N phases comprises alternatively turning on a control switch of each of the N phases for a fixed amount of time in response to the output pulse.

16. A DC-DC converter, comprising:
   N phases electrically coupled in parallel, each phase including a control switch electrically coupled to a terminal of an inductor of the phase, N being an integer greater than one; and
   a control system, including:
      a pulse generator for generating a stream of fixed on-time pulses, each pulse triggered in response to current through an alternating one of the N phases falling to a threshold value, and
      a frequency divider for dividing the stream of fixed on-time pulses into N alternatively asserted phase signals for respectively controlling the control switches of N phases, to regulate an output voltage of the DC-DC converter.

17. The DC-DC converter of claim 16, the DC-DC converter having a topology selected from the group consisting of a multiphase buck converter, a multiphase boost converter, a multiphase buck-boost converter, a multiphase isolated full bridge converter, a multiphase isolated half bridge converter, and multiphase push-pull converter.

18. The DC-DC converter of claim 16, further comprising an error amplifier operable to determine the threshold value from a difference between a reference voltage and the output voltage of the DC-DC converter.

19. The DC-DC converter of claim 18, the control system further comprising a comparator for comparing the threshold value to a signal representing the current through an alternating one of the N phases, to trigger the pulse generator.

20. The DC-DC converter of claim 19, further comprising N switches communicatively coupling the comparator to the signal representing the current through an alternating one of the N phases, the N switches being alternatively closed at the beginning of each fixed on-time pulse.

* * * * *